United States Patent [19]

McEathron

[11] E Re. 30,079

[45] Reissued Aug. 21, 1979

[54] FLUID BRAKE CONTROL SYSTEM

[75] Inventor: Eugene D. McEathron, Watertown, N.Y.

[73] Assignee: General Signal Corporation, Rochester, N.Y.

[21] Appl. No.: 796,792

[22] Filed: May 13, 1977

Related U.S. Patent Documents

Reissue of:

[64] Patent No.: 3,966,271
Issued: Jun. 29, 1976
Appl. No.: 604,405
Filed: Aug. 13, 1975

[51] Int. Cl.[2] ..... B60T 15/32
[52] U.S. Cl. ..... 303/69; 303/82
[58] Field of Search ..... 303/59, 64, 66, 68, 303/69, 81, 82, 37, 38

[56] References Cited

U.S. PATENT DOCUMENTS

| | | | |
|---|---|---|---|
| 2,077,930 | 4/1937 | Hewitt | 303/69 |
| 2,392,185 | 1/1946 | Pickert | 303/68 |

*Primary Examiner*—Duane A. Reger
*Attorney, Agent, or Firm*—Pollock, Vande Sande & Priddy

[57] ABSTRACT

A fluid brake control system is disclosed for having an improved brake cylinder release control device for use in association with a brake control pipe, a fluid reservoir, and a service valve. The control device has a housing containing a differential abutment subject to actuation from a normal position by differences in pressure between a release spring in a chamber on one side of the abutment and pressure selectively applied to the abutment in another chamber on the opposite side of the abutment. A plurality of poppet type valves operated by longitudinal push rods connected by a bridge are provided in the chamber on each side of the abutment, the bridge being actuated at a midpoint by the abutment.

11 Claims, 1 Drawing Figure

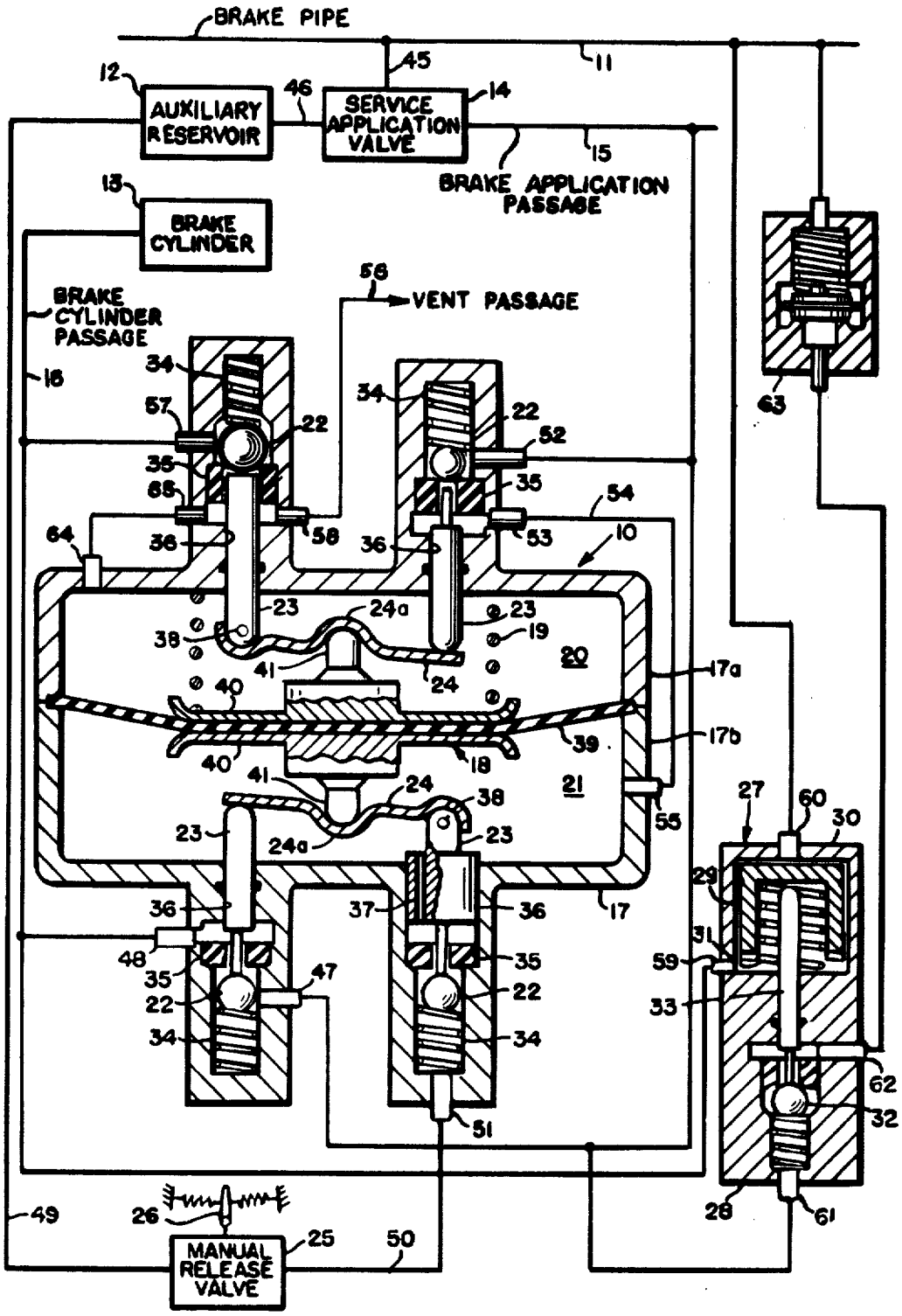
BRAKE PIPE
AUXILIARY RESERVOIR
SERVICE APPLICATION VALVE
BRAKE APPLICATION PASSAGE
BRAKE CYLINDER
BRAKE CYLINDER PASSAGE
VENT PASSAGE
MANUAL RELEASE VALVE

FLUID BRAKE CONTROL SYSTEM

Matter enclosed in heavy brackets [ ] appears in the original patent but forms no part of this reissue specification; matter printed in italics indicates the additions made by reissue.

BACKGROUND OF INVENTION

This invention relates to fluid brake control systems, and while the invention is subject to a wide range of applications, a preferred embodiment of the invention will be particularly described as applied to a fluid brake control system having an improved brake cylinder release control device.

The present invention is an improvement over currently used brake cylinder release control devices such as the brake cylinder release control device of the well-known ABD control valve generally used for governing the brakes of freight cars. In the ABD valve, a brake cylinder release control device is provided in the form of a pressure operated spool valve. This valve is costly to manufacture, requires substantial longitudinal movement to provide the selections required, and requires periodic maintenance because of wear of seals actuated across valve ports.

An object of the present invention is to provide a fluid brake control system having an improved brake cylinder release control device which substantially obviates one or more of the limitations and disadvantages of the described prior system.

Another object of the present invention is to reduce manufacturing and maintenance cost of brake application and release control devices.

Other objects, purposes and characteristic features of the present invention will be in part obvious from the accompanying drawings, and in part pointed out as the description of the invention progresses.

SUMMARY OF INVENTION

A fluid brake control system is disclosed having an improved brake cylinder release control device for use in association with a brake control pipe, a fluid reservoir, a brake cylinder, a service valve, a brake application passage and a brake cylinder passage. The control device has a housing containing a differential abutment subject to actuation from a normal position by differences in pressure between a release spring in a chamber on one side of the abutment and pressure selectively applied to the abutment in another chamber on the opposite side of the abutment. At least one poppet type valve is provided on each side of the abutment and is spring biased in the direction of a valve seat disposed between the associated valve and the abutment. A poppet type valve on one side of the abutment is normally closed against its seat and opened by movement of the abutment in the direction of the release spring for releasing fluid from the brake cylinder. A poppet valve on the other side of the abutment is maintained open normally by actuation of the release spring against the abutment and is closed by movement of the abutment in the direction of the release spring for preventing flow of fluid from the brake application passage to the brake cylinder.

A second poppet type valve is provided on each side of the abutment and a bridge is provided on each of the chambers disposed across ends of valve operating push rods and subject to actuation by contact at an intermediate point with the abutment.

A fluid circuit is opened by the second valve on one side of the abutment for applying fluid from an application passage to the other chamber when the other chamber becomes initially pressurized.

The second valve in the other chamber is normally open to permit pressurization of the other chamber upon operation of a manual release valve by permitting flow of fluid from the reservoir to the other chamber.

An associated equalizing control device is provided having a spring biased piston subject at times to opposing pressures of the brake pipe and brake cylinder respectively and having a poppet type valve operably connected to the piston by a push rod for connecting the brake application passage to the brake pipe when pressure in the brake pipe exceeds pressure in the brake cylinder by an amount determined by the piston spring.

For a better understanding of the present invention, together with other and further objects thereof, reference is had to the following description taken in connection with the accompanying drawing, while its scope will be pointed out in the appending claims.

The accompanying drawing illustrates a preferred embodiment of the present invention schematically and by an axial sectional view of the brake cylinder control device and associated equalization device.

With reference to the drawing, a fluid brake control system is disclosed having an improved brake cylinder release control device 10 for use in association with a brake control pipe 11, an auxiliary reservoir 12, a brake cylinder 13 and a service application valve 14 governing flow of fluid from the reservoir 12 through a brake application passage 15 and a brake cylinder passage 16 to brake cylinder 13. The control device 10 has a housing 17 containing a differential abutment 18 subject to actuation from a normal position by differences in pressure between a compressed release spring 19 in a chamber 20 on one side of the abutment 18 and pressure selectively applied to the abutment 18 in another chamber 21 on the lower side of the abutment 18. A plurality of ball poppet type valves 22 are provided in each of the chambers 20 and 21 having longitudinal push rods 23 connected by a bridge 24 disposed between ends of the push rods 23 and the abutment 18, the abutment 18 bearing on the bridge 24 at an intermediate point 24a.

A manual release valve 25 and an associated manual lever 26 are provided for manual initiation to an operated position of the brake cylinder release control device 10.

An associated equalization control device 27 is provided having a housing 28 with a bore 29 formed therein for receiving a piston 30 biased in an upward direction by a compression spring 31. A ball poppet type valve 32 is normally closed and has a push rod 33 longitudinally disposed between the piston 30 and valve 32 for actuation of valve 32 in accordance with the downward movement of piston 30.

The ball poppet type valves 22 of the device 10 are biased in the direction of the abutment 18 by springs 34, the upper valves 22 being normally biased against their seats 35, and the lower valves 22 being normally maintained off of their seats 35 because of the actuation of abutment 18 downwardly by spring 19.

Push rods 23 are freely slideable in bores 36 in the housing 17 and have suitable O-rings associated therewith for preventing fluid leakage from the chambers 20 and 21. The lower right-hand push rod 23 is of larger diameter than the others for providing a longitudinal passage 37 therethrough connecting chamber 21 with the lower right-hand valve 22 chamber. Each of the bridges 24 has one end formed around the end of a push rod 23 and pivotally secured thereto by a pin 38.

Abutment 18 comprises a diaphragm 39 having its outer periphery suitably secured between upper and lower housing portions 17a and 17b. The abutment 18 also comprises annular diaphragm follower plates 40 secured on upper and lower sides of the diaphragm 39 respectively. Each of the plates 40 has an axial detent 41 extending in a direction away from the diaphragm 39 and cooperating with a recess at a midpoint 24a in one of the bridges 24.

In practice, the improved brake cylinder release control device 10 that has been described can be used in place of valves providing corresponding functions in the ABD valve, thus simplifying and improving the ABD valve control apparatus. It should be considered that the simplified disclosure of a railway car braking system in the present embodiment is done to simplify the disclosure of the present invention rather than to limit the environment in which the invention can be applied. For example, additional controls can be provided as is well-known in the ABD valve for charging the auxiliary reservoir, control of the rate of charging of the brake cylinder 13 and the like.

Upon initially charging the brake pipe 11, fluid is applied over passage 45 to the service application valve 14, and from there through passage 46 to the auxiliary reservoir 12. Under normal conditions, with the brake pipe 11 fully charged, the abutment 18 of the brake cylinder release device 10 is actuated downwardly by spring 19 because neither of the chambers 20 and 21 is pressurized, maintaining the lower valve 22 normally open.

To illustrate the mode of operation of the system, it will be assumed that brake pipe pressure is reduced in brake pipe 11 to signal a brake application, and the sensing of such reduction causes the service application valve 14 to apply fluid pressure from the auxiliary reservoir 12 to brake application passage 15. This pressure is applied to brake cylinder 13 through inlet and outlet ports 47 and 48 respectively of the lower left-hand normally open valve 22 of the brake cylinder release control device 10.

If, while the brakes are applied at either emergency or service pressure as when a car is set out of a train, an operator wishes manually to release the brakes, he actuates lever 26 associated with manual release valve 25 and thus applies fluid pressure from auxiliary reservoir 12 to the pressure chamber 21 below the abutment 18. Fluid is applied to chamber 21 under these conditions through passages 49 and 50, inlet port 51 of the lower right-hand valve 22 that is normally open and through passage 37. Pressure building up in chamber 21 causes abutment 18 to move upwardly, opening the upper valves 22 and subsequently closing the lower valves 22. The opening of upper right-hand valve 22 causes fluid to flow from the brake application passage 15 through inlet and outlet ports 52 and 53 respectively of now open upper right-hand valve 22, passage 54 and inlet port 55 to the pressure chamber 21. This provides that even though the operator permits the manual lever 26 to be restored to its normal position, the abutment 18 will be fully actuated to its upper position and held there until the service application valve 14 is restored from its actuated position to terminate the flow of fluid from auxiliary reservoir 12 to the brake application passage 15. The opening of the upper left-hand valve 22 vents fluid from brake cylinder 13 to atmosphere through brake cylinder passage 16, inlet and outlet ports 57 and 58 of upper left-hand valve 22, and vent passage 56.

The movement of abutment 18 upwardly permits the closing of both lower valves 22. The closure of the left-hand lower valve 22 prevents further flow of fluid from the brake application passage 15 to the brake cylinder. The closure of the lower right-hand valve 22 disconnects the lower pressure chamber 21 from the manual release valve 25 and thus from the auxiliary reservoir 12.

When the car is substantially recoupled into a pressurized brake line, brake pipe 11 becomes pressurized and causes service application value 14 to be restored to its normal position wherein the brake application passage 15 becomes disconnected from the auxiliary reservoir 46. When this is done, the brake application passage 15 becomes vented to atmosphere by a passage that is not shown, and thus fluid pressure in chamber 21 becomes reduced because of its connection through upper right-hand valve 22 to the passage 15. Spring 19 then actuates abutment 18 downwardly to close the upper valves 22 and open the lower valves 22 to restore the brake release control device 10 to its normal condition. The upper chamber 20 is always connected to vent passage 56 through a port 64 in the housing 17 and ports 65 and 58 of upper left-hand valve 22.

If for some reason the auxiliary reservoir 12 is at a higher pressure than brake pipe 11 when the brake pipe pressure is restored to normal, the service application valve 14 does not reset to normal, but when the brake cylinder pressure is substantially reduced at inlet port 59 of reset device 27, the application of substantial brake pipe pressure to inlet port 60 of this device actuates the piston 30 downwardly against the bias of spring 31 to open valve 32 and permit fluid to equalize between the auxiliary reservoir 12 and brake pipe 11 through inlet and outlet ports 61 and 62 respectively of valve 32, and through check valve 63. When this equalization becomes effective, service application valve 14 becomes reset, and the brake cylinder release control device 13 is restored to normal as has been described. The reset device 27 becomes restored to its normal position the next time the brakes are applied thus applying brake cylinder pressure to the underside of piston 30 and reducing the differential across this piston to a point where the spring 31 will restore the piston 30 to its normal upper position and close valve 32.

Having thus described a fluid brake control system for a vehicle having an improved brake cylinder release control device and an improved equalization control device as a preferred embodiment of the present invention, it is to be understood that various modifications and alterations may be made to the specific embodiment shown without departing from the spirit or scope of the invention.

What is claimed is:

1. A fluid brake control system for a vehicle having a brake control pipe, a fluid reservoir, a brake cylinder, and a service valve governing flow of fluid from the reservoir through brake application and brake cylinder passages successively to the brake cylinder, wherein an improved brake cylinder release control device comprises:

a. a housing containing an abutment subject to actuation from a normal position by differences in pressure between a release spring in a chamber on one side of the abutment and pressure selectively applied to the abutment by another chamber on the opposite side of the abutment, b. at least one poppet type valve means on each side of the abutment spring biased in the direction of a valve seat disposed between the associated valve means and the abutment, c. the poppet valve means on one side of the abutment being normally closed against its seat and opened by movement of the abutment in opposition to the pressure of the release spring for releasing fluid from the brake cylinder, and d. the poppet valve means on said other side of the abutment being maintained open normally by action of the release spring against the abutment and being closed by movement of the abutment in opposition to the pressure of the release spring for preventing flow of fluid from the brake application passage to the brake cylinder passage.

2. A fluid brake control system according to claim 1 wherein the control device has a second poppet type valve means on each side of the abutment, a bridge in each of the chambers subject to actuation by the abutment at an intermediate point, and push rods disposed longitudinally between the valve means and ends of the bridges respectively for causing actuation of the valve means in accordance with movement of the abutment.

3. A fluid brake control system according to claim 2 wherein means is provided for applying fluid from the application passage to said another chamber when the second valve means is open on said one side of the abutment.

4. A fluid brake control system according to claim 3 wherein manual release valve means is provided for applying fluid from the reservoir to said another chamber when the second valve means is open on said other side of the abutment.

5. A fluid brake control system according to claim 4 wherein the valve means are of the ball poppet type.

6. A fluid brake control system according to claim 4 wherein an associated equalization control device is provided having a spring biased piston subject to opposing pressures of the brake pipe and brake cylinder respectively and having a poppet type valve means operably connected to the piston by a push rod for connecting the brake application passage to the brake pipe through a check valve means when pressure in the brake pipe exceeds pressure in the brake cylinder by an amount determined by the piston spring.

7. A fluid brake control system according to claim 6 wherein the piston operated poppet type valve means is a ball poppet valve type having a push rod longitudinally disposed between the piston and the associated valve means.

*8. A fluid brake control system for a vehicle having a brake control pipe, a fluid reservoir, a brake cylinder, and a service valve governing flow of fluid from the reservoir through brake application and brake cylinder passages successively to the brake cylinder, wherein an improved brake cylinder release control device comprises:*

*a. a housing containing an abutment subject to actuation in response to the pressure of fluid in a chamber acting on said abutment in opposition to an opposing force acting also on said abutment,*

*b. at least one valve means disposed on each side of said abutment, each said valve means being of the poppet type and having relatively movable seat and closure elements, at least one of which is operatively connected to the associated side of said abutment,*

*c. said poppet valve means on one side of said abutment being opened by movement of said abutment in response to an increase in fluid pressure in said chamber in excess of a predetermined value to release fluid from said brake cylinder,*

*d. said poppet valve on the other side of said abutment being closed by movement of said abutment in response to an increase in fluid pressure in said chamber in excess of said predetermined value to prevent the flow of fluid from said brake application passage to said brake cylinder passage.*

*9. The system of claim 8 wherein said poppet valve means are of the spring-biased ball closure type.*

*10. The system of claim 8 in which a movable element of each said valve means is operatively connected to said abutment by a push rod.*

*11. The system of claim 8 which includes a further poppet type valve means disposed on said other side of said abutment and being normally open when the pressure of fluid in said chamber is less than said predetermined value to permit fluid under pressure to be supplied to said chamber in response to a manual brake release signal, said further valve means being closed by movement of said abutment in response to said fluid pressure in said chamber attaining said predetermined value.*

* * * * *